United States Patent [19]

Anderson, Jr.

[11] Patent Number: 4,932,686
[45] Date of Patent: Jun. 12, 1990

[54] TELESCOPING CONNECTOR FOR A FLUID COUPLING ASSEMBLY

[75] Inventor: Russell C. Anderson, Jr., N. Tonawanda, N.Y.

[73] Assignee: General Motors Corporation, Detroit, Mich.

[21] Appl. No.: 379,381

[22] Filed: Jul. 13, 1989

[51] Int. Cl.$^5$ ............................................. F16L 35/00
[52] U.S. Cl. ..................... 285/24; 285/175; 285/302; 29/434
[58] Field of Search .................. 285/32, 302, 24, 27, 285/175; 29/434

[56] References Cited

U.S. PATENT DOCUMENTS

| | | | |
|---|---|---|---|
| 373,256 | 11/1887 | Traver et al. | 285/302 X |
| 793,414 | 6/1905 | Callanan | 285/302 X |
| 1,204,728 | 11/1916 | Arena | 285/302 |
| 1,580,325 | 4/1926 | Perry | 285/302 |
| 2,297,966 | 10/1942 | Luff | 285/32 |
| 2,359,846 | 10/1944 | Hayman | 285/32 |
| 3,399,548 | 9/1968 | Burns | 285/302 X |
| 3,461,877 | 8/1969 | Morch | 285/32 X |
| 4,083,410 | 4/1978 | Anderson | 285/32 X |
| 4,687,232 | 8/1987 | Zimmerman | 285/302 X |

Primary Examiner—Dave W. Arola
Attorney, Agent, or Firm—R. L. Phillips

[57] ABSTRACT

A telescoping connector for a coupling assembly is disclosed having a first telescoping tubular member connected to a fluid line and a second telescoping tubular member. The second tubular member includes internal threads adapted to engage cooperating external threads on the first tubular member. The first tubular member is integrally attached to the fluid line and the threads of the second telescoping tubular member are threaded over the threads on the first tubular member and run out. The threads on the second tubular member can then axially slide over a limited neck portion of the first tubular member defined by the distance between its threads and a shoulder formed thereon. This telescoping axial movement enhances the connection process of solid wall, stationary fluid lines. A dual O-ring assembly prevents fluid leakage between the telescoping tubular members.

2 Claims, 1 Drawing Sheet

TELESCOPING CONNECTOR FOR A FLUID COUPLING ASSEMBLY

TECHNICAL FIELD

The present invention relates generally to connectors for coupling assemblies and, more particularly, to a telescoping connector for a coupling assembly particularly useful in the transfer of refrigerant between solid wall, stationary/inflexible lines whereby easier and more efficient mating of the lines is accomplished.

BACKGROUND OF THE INVENTION

There are many different types of couplers for coupling assemblies utilized in connecting fluid lines, such as refrigerant lines. The most widely accepted designs generally utilize a male coupler fitted into a fastening collar of a female coupler.

When two independent or spaced fluid lines are to be mated and connected, the male coupler is of course attached to one line and the female coupler is attached to the other line. The male coupler and the female coupler are adapted to engage and lock together, as for example with threads. The male/female couplers are twisted relative to each other until the two lines are brought into sealed engagement to form a continuous line.

The critical aspect of such coupling assemblies is to ensure that the endpoints of the two lines are brought together in perfect alignment for the best sealed engagement. Conventional coupling assemblies such as those generally described above, presuppose that one or both of the lines are capable of being moved into an alignment position for proper sealing.

One approach prevalent in the art to do this is to use reinforced rubber and plastic hoses to carry the fluid to at least one of the couplers. These types of fluid lines provide the desired degree of flexibility and extendability, allowing for precise positioning of the two mating lines. With solid wall, metal lines however, such as those used to transport refrigerant in automobile air conditioning systems and preferred for their durability and strength, the ability to extend the lines into a mating position for sealed engagement can be extremely difficult. It may sometimes be necessary to physically bend the lines in order to facilitate the connection. This may require a great deal of time and physical energy to provide the lines with the proper orientation. In addition, if proper sealed engagement cannot be attained, there is a probability of fluid leakage due to ineffective sealing caused by misalignment of the endpoints of the lines. Also, if the bending is not properly performed, the lines are susceptible to forming a kink and must be replaced.

Also it is desirable to allow limited telescoping action between the members after the connection is made. For example, in an automotive air conditioning system relative axial movement can accommodate mechanically caused component movement, as well as slight movement due to thermal expansion and contraction.

SUMMARY OF THE INVENTION

It is accordingly, a primary object of the present invention to provide a telescoping action to a coupling assembly that may be utilized in connecting solid wall, stationary fluid lines.

Another object of the present invention is to provide a telescoping connector for a coupling assembly allowing limited axial movement of a portion of the coupling assembly while maintaining proper sealing for fluid containment.

Still another object of the present invention is to provide a telescoping connector for a coupling assembly to facilitate the ease of axially mating two solid wall and relatively stationary fluid lines.

A further object of the present invention is to provide a connector for a fluid coupling assembly that uses telescoping fluid lines with mating threads for axial guidance during assembly, including after run out of the threads, and further cooperating to form the axial limiting means of the telescoping movement.

Still another object of the present invention is to provide a telescoping connector for a coupling assembly that is easy and quick to use and simple and economical to fabricate.

Additional objects, advantages and other novel features will be set forth in part in the description that follows and in part will become apparent to those skilled in the art upon examination of the following or may be learned with the practice of the invention. The objects and the advantages of the invention may be realized and obtained by means of the instrumentalities and combinations particularly pointed out in the appended claims.

To achieve the foregoing and other objects and in accordance with the purposes of the present invention as described herein, a telescoping connector for a coupling assembly utilized in establishing a continuous fluid line is provided. The connector includes a pair of telescoping tubular members connected and sealed at their proximal ends to allow the fluid communication. The first telescoping tubular member has a distal end integral with a fluid line, for instance soldered to a standard 0.049" solid wall refrigerant line. The second telescoping tubular member has a threaded collar forming a female coupler of the coupling assembly.

O-rings are provided preferably seated in annular grooves in the first telescoping tubular member to perform the sealing function. The second telescoping tubular member fits over the first telescoping tubular member and the O-rings form a seal between the two members. The O-rings may advantageously be made of neoprene and efficiently maintain their sealing function in the presence of refrigerant as sliding or telescoping movement is allowed. There are preferably two O-rings positioned adjacent the proximal endpoint of the first tubular member. This ensures maximum efficiency for fluid containment within the two members; i.e. at the point closest to the female coupler of the second telescoping member.

According to an important aspect of the invention, the telescoping connector provides limited axial movement so as to alleviate the problems associated with two factors; i.e. connecting the endpoints of solid wall, stationary fluid lines, as well as the need for limited movement once the connection is completed. More specifically, the telescoping nature of the connector, resulting in the limited axial movement, allows sufficient flexibility for the coupling assembly to move to a position to fit the two fluid lines together in perfect alignment. Concerning the second factor, the connector responds to relative mechanical/thermal motion that can occur in the system during operation.

To explain further how the telescoping connector is used to facilitate the proper connection of fluid lines, a standard female coupler is provided over the distal end of the second telescoping tubular member. The female coupler preferably has threads on its inner annular surface adapted to engage threads formed on the outer annular surface of a standard male coupler (not shown). The female coupler is prevented from slipping off the tubular member by an annular flange integrally formed thereon.

The second telescoping tubular member has an inner bore having a diameter greater than the outer diameter of the standard refrigerant line. As the first step of the assembly process, this advantageously allows the second tubular member to slide over the refrigerant line. In other words, the installer of the coupling assembly slides the second member over the refrigerant line to a point far enough past the endpoint so that at least several inches of the end section of the refrigerant line is exposed.

The first telescoping tubular member of the connector is designed with an inner bore whose diameter at its distal end is substantially the same as the outer diameter of the refrigerant line. This inner bore of the first telescoping tubular member narrows at a point a distance away from the distal end. This in effect forms a socket into which the refrigerant line is inserted for the second step of the assembly process. The relative diametral sizes of the refrigerant line and the inner bore of the first telescoping tubular member as described above allows the refrigerant line to seat in the socket in tight engagement. The reduction in the inner diameter of the first telescoping tubular member also creates an annular ridge against which the end of the refrigerant line firmly abuts.

After the refrigerant line is thus inserted into the socket of the first telescoping tubular member, the refrigerant line is integrally attached so that relative movement between them is prevented. This may be accomplished by methods well known in the art, such as soldering or brazing. It is important to appreciate that the second telescoping tubular member is at this point being loosely held captive on the refrigerant line until the integral connection between the first telescoping tubular member and the refrigerant line is accomplished.

In an important aspect of the invention, the first telescoping tubular member includes external threads formed on the outer annular surface at its distal end substantially coextensive along the socket section. These threads are adapted to engage internal threads formed on the inner annular surface of the proximal end of the second telescoping tubular member. After the first telescoping tubular member is soldered or brazed to the refrigerant line, the second telescoping tubular member including the female coupler is slid back towards the end of the refrigerant line by the installer until the threads engage the mating threads of the distal end of the first telescoping tubular member. The second telescoping tubular member is then twisted onto the first telescoping tubular member until the threads run out.

During the threading and run out process, the two members are held axially aligned to assure ease of movement and proper coupling. This is accomplished by the mating threads and the mating inner and outer diameters. The inner diameter of the second tubular member closely engages the outer diameter of the first tubular member at both ends, including along the external threads. Similarly, the crests of the internal threads of the second member match and are guided along a central neck portion of the first member. It will be realized that after the run out is complete and the threads on the telescoping tubular members are disengaged, the second telescoping tubular member is still guided as it slides axially towards the final coupling position.

In accordance with a further aspect of the invention, the first telescoping tubular member of the connector includes an annular shoulder defining a limiting point on its proximal end past which further axial movement is prevented. The neck portion is thus defined on the first telescoping tubular member between the annular shoulder and the point of thread runout. The threads of the second telescoping tubular member thus are allowed to slide axially over only a limited defined distance. It will be recognized that this arrangement positively retains the second tubular member in connecting relationships with the first tubular member.

Since the second member is positioned over the refrigerant line first during the installation process of the coupler assembly, the O-rings positioned on the first member are never engaged by the threads on the second member, thus eliminating a possible cause of damage and potential leakage.

As protection against fluid leakage around the female coupler, an additional O-ring may be fitted against the side of the annular retainer flange on the second telescoping tubular member closest to its distal end.

With the telescoping connector so assembled, axial movement of the female coupler is permitted. This axial movement allows the female coupler to approach and mate with a solid wall, stationary fluid line which has associated with it a standard male coupler (now shown). The flexibility offered by the limited axial movement of the telescoping connector alleviates the criticality of endpoint location of spaced fluid lines and allows limited movement between the air conditioning components during operation. Advantageously, this arrangement reduces the possibility of cut or pinched O-rings due to misalignment of endpoints and/or engagement with sharp threads during assembly, thus providing better protection against leakage.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications and various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the operating aspects and principles of the invention. In the drawing.

Reference will now be made in detail to the present preferred embodiment of the invention, an example of which is illustrated in the accompanying drawing.

DETAILED DESCRIPTION OF THE INVENTION

Figure 1:
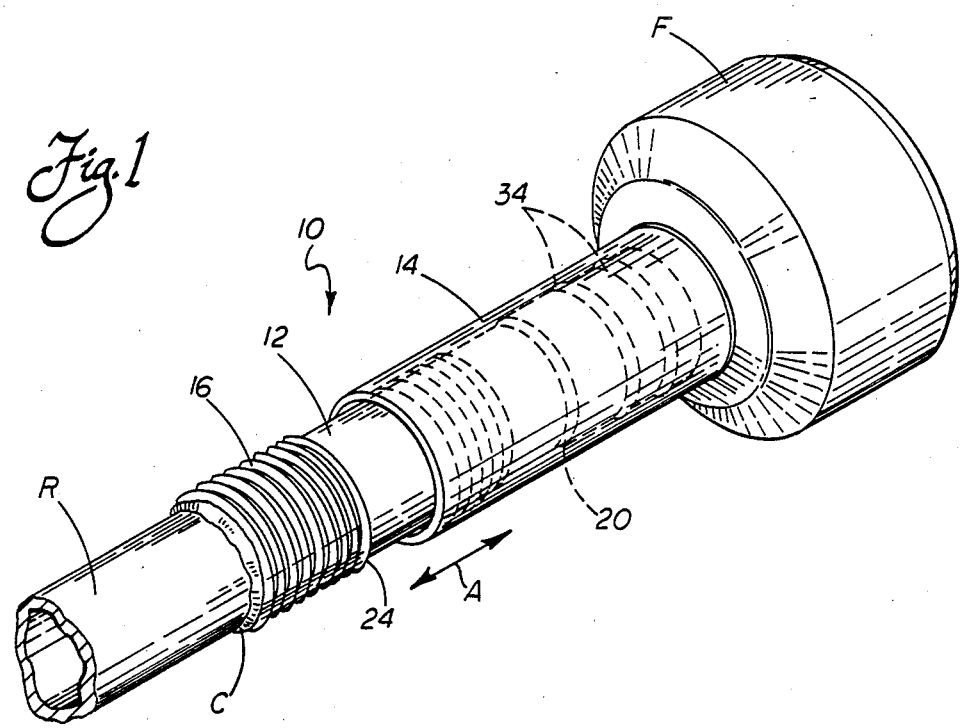
FIG. 1 is a perspective view of the telescoping connector of the coupling assembly attached at one end to a refrigerant line and at the other end to a female coupler and shown at a midpoint of sliding axial movement.
Figure 2:
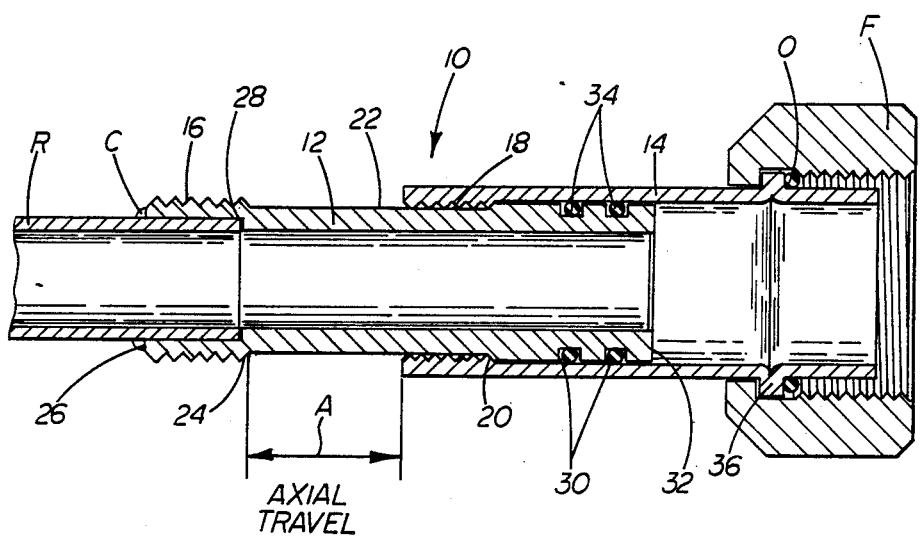
FIG. 2 is a view in cross section of the connector showing the second telescoping tubular member positioned at its right most limit point abutting against the shoulder of the first telescoping tubular member.

Reference is now made to FIGS. 1 and 2 showing a telescoping connector 10 for a coupling assembly specifically designed for use in connecting fluid lines. The preferred embodiment is particularly adapted for use in connecting refrigerant lines. It may, however, be used for connecting lines used in transporting other fluids.

The telescoping connector 10 includes a first telescoping tubular member 12 and a second telescoping tubular member 14. The first telescoping tubular member 12 cooperatively communicates with a refrigerant line R and the second telescoping tubular member 14 cooperatively communicates with a female coupler F.

The first telescoping tubular member 12 includes external threads 16 formed on the outer annular surface. The threads 16 are adapted to engage mating internal threads 18, as best shown in FIG. 2, formed on the inner annular surface of the second telescoping tubular member 14.

The first telescoping tubular member 12 also includes an annular shoulder 20 formed on its outer circumference. A neck portion 22, as best shown on FIG. 2, is defined on the first telescoping tubular member 12 between the annular shoulder 20 and the proximal end thread 24 of the threads 16. The neck portion 22 is adapted to slidably engage and positively guide the threads 18 to allow limited axial movement of the second telescoping tubular member 14 between the annular shoulder 20 and the proximal end thread 24.

Referring now specifically to FIG. 2, distal end 26 of the first telescoping tubular member 12 has an inner bore defined by a diameter matching the outer diameter of the refrigerant line R. An annular ridge 28 is formed in the bore of the first member 12 as the bore abruptly and diametrally narrows. In this manner, a socket is formed into which the refrigerant line R may be inserted.

The first telescoping tubular member 12 has a plurality of annular grooves 30, as best shown in FIG. 2, formed in its outer annular surface at its proximal end 32 and adjacent the distal end of the second tubular member 14. O-rings 34 seat within the annular grooves 30 to provide a sealing mechanism to provide fluid containment and prevent fluid leakage after the telescoping connector 10 is assembled. The preferred embodiment of the invention contemplates two O-rings 34 being included, although it can be appreciated that a fewer or greater number of O-rings 34 may be utilized.

The second telescoping tubular member 14 includes an annular flange 36, as shown in FIG. 2, specially adapted to engage a female coupler F. The annular flange 36 engages the outer rim of the coupler F acting as a retainer and forming the seat for the mating male coupler.

To achieve the advantages provided by the telescoping connector 10, the female coupler F is placed on the second telescoping tubular member 14 so that it is retained by the annular flange 36. The second telescoping tubular member 14 has an inner bore whose diameter is greater at all points than the outer diameter of the refrigerant line R. This allows the second telescoping tubular member 14 to be slid over and envelope the free end of the refrigerant line R. During the assembly process, this is the first step in successfully making the connection. The second member 14 slides over the refrigerant line R to a position whereby the end section of the refrigerant line R is exposed.

The exposed end of the refrigerant line R is inserted into the socket of the first telescoping tubular member 12. The tubular member 12 is then integrally attached to the refrigerant line R. This may be accomplished by a number of commonly known methods such as soldering or brazing. The connection between the first telescoping tubular member 12 and the refrigerant line R is generally designated as C.

It will be remembered, the second telescoping tubular member 14, is loosely positioned at this point during the assembly process on the refrigerant line R. When the connection C is completed, it is then slid back towards the end of the refrigerant line R. Just prior to this step, the O-rings 34 are placed in the annular grooves 30 so that when the second telescoping tubular, member 14 passes over the annular grooves 30, the O-rings 34 are held in sealed fashion between the two telescoping tubular members 12, 14 as shown. After the internal threads 18 are slid to the point of engagement of the external threads 16, the second tubular member 14 is threaded onto the threads 16 of the first tubular member 12.

When the internal threads 18 pass the proximal end thread 24 of the external thread 16, or run out, the threads 18 slidably engage (along their crests) the neck portion 22 (see FIG. 2). The sliding axial movement of the second telescoping tubular member 14 on the first telescoping tubular member 12, as shown by action arrow A, is limited by end points defined on the first telescoping tubular member 12. These endpoints are the proximal end thread 24 at the distal end, and the annular shoulder 20 at the proximal end.

The limited axial movement A advantageously facilitates the coupling of solid wall, stationary lines by allowing a movable coupling assembly. The female coupler F thus may be moved with the second member 14 within a range of axial movement corresponding to the distance A; that is a range equal to the distance between the proximal end thread 24 and the annular shoulder 20. The movement imparted to the female coupler F and the second member 14 allows the coupler F to be adaptively positioned to engage a standard male coupler (not shown) of other independent refrigerant line being coupled.

An O-ring O, as shown in FIG. 2, is positioned to engage the side of the annular flange 36 opposite the side which engages the outer rim of the female coupler F forming the seat for the male coupler.

In summary, numerous benefits have been described which results from employing the concept of the present invention. In particular, the telescoping connector 10 alleviates the problem associated with connecting solid wall, stationary lines by allowing limited axial movement of the female coupler F through the associated limited axial movement of the second telescoping tubular member 14. The small axial movement thus produced makes endpoint location of the respective fluid lines much less critical during assembly. The telescoping connector 10 further allows limited axial movement to accommodate relative component movement during operation. The potential for cut or pinched O-rings O due to the misalignment of endpoints is eliminated. Thus, the efficiency of the fluid communication is increased by reducing the possibility of leakage and the process of connecting the lines is made substantially easier.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

I claim:

1. A telescoping connector or a coupling assembly having a coupler utilized in connecting a fluid line, comprising:

first and second telescoping tubular members connected together at proximal ends in fluid communication; said first tubular member received in said second tubular member and having a distal end for connecting with the fluid line and said second tubular member having a distal end for connecting with the coupler;

limit means on said distal end of said first tubular member defining a limiting point for axial telescoping movement in a first direction;

annular radially outwardly extending shoulder means on said first tubular member adjacent said proximal end of said first tubular member defining a limiting point for axial telescoping movement in a second direction;

at least one O-ring on said first tubular member between said shoulder means and said proximal end of said first tubular member for sealing between said telescoping tubular members both staticly and during relative movement;

said limit means including external threads on said first tubular member;

engaging means on said proximal end of said second telescoping tubular member for engaging said limit means and said shoulder means of said first telescoping tubular member;

said engaging means including internal threads on said second tubular member;

neck means on said first telescoping tubular member between said first limit means and said shoulder means; and said internal threads of said engaging means to cooperatively engage and run out over said threads of said limit means and subsequently slidably engage said neck means between said first limit means and said shoulder means so as to guide said tubular members in axial telescoping movement;

whereby to provide sufficient telescoping movement to allow alignment and simplify connection of said coupling assembly and allow free limited sealed movement during operation.

2. A method of assembling a telescoping connector for a fluid coupling assembly utilized in connecting a fluid line, said telescoping connector having a first telescoping tubular member including a receiver for one end of the fluid line, and a second enlarged telescoping tubular member for receiving said first tubular member in telescoping sealing relationship, said tubular members including mating threads, comprising the steps of:

assembling at least one O-ring on said first tubular member at a location remote from said threads on said first tubular member and in a position to sealingly contact and slide along the interior of said second tubular member, sliding said second telescoping tubular member over said one end of the fluid line to a position whereby the end section of said fluid line is exposed, integrally attaching said first telescoping tubular member to said one end of the fluid line, sliding said second tubular member back towards said one end of said fluid line until reaching the point of engagement of the mating threads, threading said second tubular member over said first tubular member until said mating threads run out, sliding said second tubular member axially along said first tubular member, connecting said second tubular member to the other end of said fluid line being coupled, and limiting the telescoping movement between said tubular members, whereby to provide sufficient telescoping movement to allow alignment and simplify connection of said coupling assembly and allow limited sealed movement during operation.

* * * * *